US010081571B2

(12) United States Patent
Omar

(10) Patent No.: US 10,081,571 B2
(45) Date of Patent: Sep. 25, 2018

(54) NOX REDUCTION PROCESS IN A CEMENT KILN MANUFACTURING SYSTEM

(71) Applicant: FLSmidth A/S, Valby (DK)

(72) Inventor: Hisham Omar, Bethlehem, PA (US)

(73) Assignee: FLSmidth A/S (DK)

( * ) Notice: Subject to any disclaimer, the term of this patent is extended or adjusted under 35 U.S.C. 154(b) by 0 days.

(21) Appl. No.: 15/573,040

(22) PCT Filed: May 9, 2016

(86) PCT No.: PCT/US2016/031519
§ 371 (c)(1),
(2) Date: Nov. 9, 2017

(87) PCT Pub. No.: WO2016/183027
PCT Pub. Date: Nov. 17, 2016

(65) Prior Publication Data
US 2018/0118617 A1    May 3, 2018

Related U.S. Application Data

(60) Provisional application No. 62/160,225, filed on May 12, 2015.

(51) Int. Cl.
C04B 7/36      (2006.01)
B01D 53/00     (2006.01)
(Continued)

(52) U.S. Cl.
CPC ............ C04B 7/364 (2013.01); B01D 53/002 (2013.01); B01D 53/56 (2013.01); B01D 53/78 (2013.01); B01D 53/79 (2013.01); F23J 15/06 (2013.01); F27B 7/2016 (2013.01); F27D 17/008 (2013.01); B01D 2251/2062 (2013.01);
(Continued)

(58) Field of Classification Search
CPC ......... C04B 7/364; C04B 7/365; B01D 53/00; B01D 53/56; B01D 53/78; B01D 53/79; F23J 15/06; F23J 15/02; F23B 7/20; F27D 17/00; F27D 17/002
See application file for complete search history.

(56) References Cited

U.S. PATENT DOCUMENTS 4,154,803 A * 5/1979 Uchikawa .............. B01D 53/56
                                                              423/239.1
5,078,973 A * 1/1992 Kuroda .............. B01D 53/8625
                                                              422/108
(Continued)

FOREIGN PATENT DOCUMENTS

CN    104998531 A  * 10/2015 ............. B01D 53/78
EP    3 219 688 A1 *  9/2017 ............... C04B 7/44
(Continued)

OTHER PUBLICATIONS

International Search Report and Written Opinion dated Aug. 4, 2016, 46 pages.

Primary Examiner — Timothy C Vanoy
(74) Attorney, Agent, or Firm — Matthew R. Weaver

(57) ABSTRACT

Disclosed is a bypass system for use with off gases that have exited a cement kiln utilized in a cement making process. The bypass system is adapted to remove both NOx and volatile components that are present in the off gases while the off gases are in the bypass duct.

4 Claims, 2 Drawing Sheets

(51) Int. Cl.
*B01D 53/56* (2006.01)
*B01D 53/78* (2006.01)
*B01D 53/79* (2006.01)
*F23J 15/06* (2006.01)
*F27B 7/20* (2006.01)
*F27D 17/00* (2006.01)

(52) U.S. Cl.
CPC ............... *B01D 2251/2067* (2013.01); *B01D 2257/2025* (2013.01); *B01D 2257/2064* (2013.01); *B01D 2257/302* (2013.01); *B01D 2257/404* (2013.01); *B01D 2257/602* (2013.01); *B01D 2258/0233* (2013.01); *B01D 2259/124* (2013.01); *F23J 2215/10* (2013.01)

(56) References Cited

U.S. PATENT DOCUMENTS

| | | | |
|---|---|---|---|
| 5,365,866 | A | 11/1994 | Von Seebach et al. |
| 9,855,527 | B2 * | 1/2018 | Stender .............. B01D 53/8656 |
| 9,914,664 | B2 * | 3/2018 | Schuermann ........... C04B 7/365 |
| 2009/0169453 | A1 | 7/2009 | Saito et al. |
| 2014/0170046 | A1 | 6/2014 | Schmidt et al. |
| 2018/0038648 | A1 * | 2/2018 | Schuermann ............. F27B 7/20 |

FOREIGN PATENT DOCUMENTS

| | | | | |
|---|---|---|---|---|
| WO | 2015052123 A1 | 4/2015 | | |
| WO | WO 2015 067 363 A1 * | 5/2015 | ......... | B01D 53/8656 |
| WO | WO 2017 012 880 A1 * | 1/2017 | ............. | B01D 53/56 |

* cited by examiner

NOX REDUCTION PROCESS IN A CEMENT KILN MANUFACTURING SYSTEM

The present invention relates to an apparatus and a method for reducing the quantity of volatile components such as chloride, alkali and sulfur which are introduced to a cement manufacturing plant in conjunction with the cement raw materials and fossil fuels, while further reducing or eliminating NOx emissions from cement kiln exhaust gases while improving fuel consumption.

BACKGROUND OF THE INVENTION

Cement raw meal used in the production of cement clinker, along with the fossil fuels used in the cement manufacturing process, both contain undesirable materials such as chlorine and sulfurs which vaporize in the temperatures encountered in a rotary kiln, are carried out of the kiln in the kiln exhaust gases and thereafter re-condense in the preheater region of the cement clinker plant. These materials build up over time and are harmful both to cement quality and the efficiency of the cement making process and hinder the "uptime" of the operation.

To reduce the buildup of such materials it has been known to utilize a cement bypass gas removal system, in which a portion of the kiln exhaust (i.e "off") gases containing the volatile compounds is directed away from the preheater system. The exhaust gases enter a bypass conduit typically at either the lower region of the rotary kiln exhaust gas riser duct or the rotary kiln entry chamber. The optimum amount of exhaust gases directed off via such a bypass will typically begin at about 10% and will increase proportionately with the amount of undesired vaporized materials in the exhaust gas stream, which in turn is a function of the specific components of the raw materials. At cement plants that utilize raw materials that contain particularly large amounts of undesirable materials amounts as high as about 40-50%, and at times up to about 70%, by mass of the kiln exhaust gases are directed into the bypass conduit. Once in the bypass the kiln exhaust gases are typically cooled, such as by inserting external air into the bypass line or into a mixing chamber that is located within the bypass line. The cooling air quenches the kiln exit hot gases resulting in the condensation of the vaporous harmful substances contained in the bypass gas flow onto dust particles that are naturally entrained in the gases. The dust particles containing the condensed harmful substances are then separated from the cooled bypass gas flow in a dust separator.

A further pressure on cement producers in the United States is to reduce nitrogen oxide (NOx) emissions that are a byproduct of the cement manufacturing process. Cement manufacturing conditions are particularly favorable for formation of NOx because of the high process temperatures and oxidizing atmospheres involved. Since NOx is an ozone-forming precursor, uncontrolled or under controlled NOx emissions from cement manufacturing are widely recognized as exacerbating ozone related problems.

Federal New Source Performance Standards mandate NOx emissions limits in the main stack of cement plants to 1.5 lb NOx/ton of cement clinker. To meet these standards cement manufacturers primarily utilize a Selective Noncatalytic Reduction (SNCR) system which basically entails the injection of ammonia in the form of ammonia water or urea in the flue-gas at area in the cement making process where such flue gas is at a suitable temperature. An ammonia solution (appx. 20%) is the reagent that has been most often used for cement kilns, with such a solution being particularly effective for preheater/precalciner cement kiln applications. Urea is also known to be a suitable reagent. For such applications, it is taught to locate the NOx system at a point in the cement manufacturing process at which the temperature of the gas stream is within the temperature window appropriate for an SNCR system, and in particular for reagent injection. Typical locations at which the temperatures are suitable are at the precalciner exit and in the lower section of the cyclone preheater tower.

Federal NOx standards become increasingly difficult to achieve economically as the amount of exhaust gases drawn off via cement kiln bypass systems increases. Therefore, in the prior art bypass gases cleansed of volatiles are redirected to the precalciner and thereafter to the NOx reduction system incorporated in the cement manufacturing process. However, redirecting bypass gases in such a manner has been shown to result in significant increases in fuel consumption, thus making the process economically unfeasible. Taking the alternative route of directing bypass gases that are cleaned of undesirable materials to the main stack or other areas of the plant will result in higher NOx rates which may prevent NOx emission standards from being met.

It would be desirable, therefore, to have a method to reduce undesirable materials from kiln exhaust gases while achieving suitable NOx emission rates that does not significantly increase fuel consumption.

SUMMARY OF THE INVENTION

According to the present invention, extracted kiln gases in a bypass duct are promptly subject to a first air quenching to approximately 900° C. shortly after entering the duct to assure proper gas temperature for SNCR injection. After SNCR injection in the bypass duct, the extracted kiln gases are subject to secondary cooling, such as by being air quenched to approximately 375° C., to further assure the condensation of volatile matters on dust. The dust is removed from the gas stream and the cleaned gases are preferably recycled back to the process to recover their heat values.

BRIEF DESCRIPTION OF THE DRAWINGS

A more particular description of the invention briefly summarized above is set forth below by way of particular embodiments disclosed in the drawings of this specification and as described in connection therewith. The drawings nevertheless illustrate only typical, particular embodiments of the invention and are not to be considered limiting thereon as the invention may admit to other equally effective embodiments. In the drawings.

DETAILED DESCRIPTION OF THE INVENTION

Figure 1:
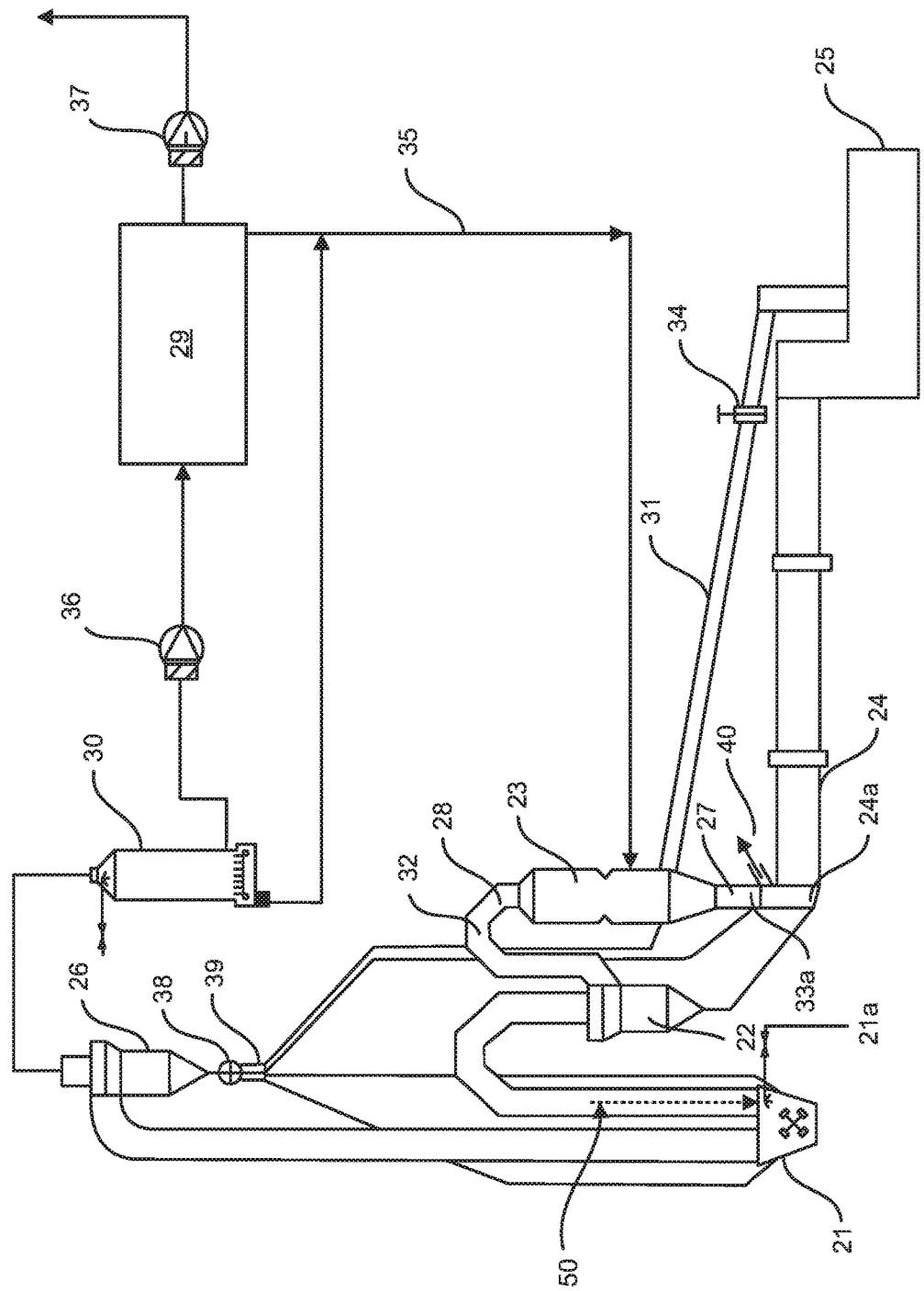
FIG. 1 is a flowchart showing an embodiment according to a cement kiln plant having a chlorine/sulfur/alkalis bypass system.

With reference to FIG. 1, there is illustrated a cement producing facility comprising in part a raw meal crushing means which as depicted is a drier crusher 21, a preheater 22, which can consist of one or a plurality of cyclone preheaters, calciner 23, a cement rotary kiln 24 in which cement raw materials traveling in counter flow to hot kiln gases are burned into cement clinker and a clinker cooler 25. As illustrated, FIG. 1 is an example of a semi-dry cement making process in which a kiln bypass system is utilized. A kiln bypass system can also be used in a dry system, in which case the initial raw meal will not be fed in slurry form and the raw meal crushing means will be a raw mill instead of a drier crusher, Cement raw meal in the form of slurry is fed into drier crusher 21 at entry 21*a* and is deglomerated and dried in the presence of hot kiln off-gases from preheater 22. The dried raw meal is directed to a de-dust cyclone 26, and the de-dusted raw meal is directed via rotary feeder 38 and splitter 39 to both the kiln riser 27 and precalciner 23, with a minor portion of the collected de-dusted raw meal being directed to drier crusher 21 to improve the drying process. The amount of dry raw meal directed to the kiln riser 27 is governed by the temperature at the point of insertion into the kiln riser 27 as the dry raw meal is utilized to protect the kiln riser lining from excessive heat. The raw meal streams into the kiln riser 27 and precalciner 23 get calcined in precalciner 23 and collected in preheater 22. The calcined and collected raw meal is thereafter directed to cement rotary kiln at 24*a*.

The preheated and precalcined cement raw meal is burnt in a rotary kiln 24 to form cement clinker, which is thereafter directed to a clinker cooler 25. The typically ambient air utilized in the clinker cooler 25 absorbs heat from the clinker. A portion of the thus heated air from the clinker cooler is directed into kiln 24, and from there to kiln riser duct 27 for diverting the kiln exhaust gases from the rotary kiln and from thereafter into the precalciner 23. Combustion air for the precalciner 23 is furnished from a second portion of off gases from clinker cooler 25 via a tertiary air duct 31 with the combustion air flow modulated by optional air damper 34.

The dust laden off-gas from de-dust cyclone 26 is directed to bag filter 29 for dedusting. An exhaust gas heat exchanger 30, which may be a gas conditioning tower, is used to adjust the gas temperatures at the bag filter 29 gas inlet to a temperature that promotes condensing of volatile mercury on the dust particles and wherein further a predetermined portion of the dust collected is sent to waste to keep mercury emission in the process under control, with the balance being directed from bag filter 29 to precalciner 23 via return duct 35. Upstream from bag filter 29 is preheater ID fan 36 and downstream is main filter fan 37.

An in-line SNCR injection/NOx removal system 28 can be arranged in preheater duct 32 located between the precalciner 23 and preheater 22, wherein a reagent such as urea or ammonia is injected into the hot flue gas, which at that specific location in the cement making process has a temperature (approximately between about 850° C. to about 950° C. for ammonia injection and between about 920° C. to about 1050° C., for urea injection) that facilitates a reaction of the reagent with NOx to thereby convert NOx to molecular nitrogen, carbon dioxide and water.

The invention further comprises a cement kiln chlorine/sulfur/alkalis bypass system 40 containing a NOx removal system into which a portion, which can be a majority portion, of the kiln gas is extracted from the feed end (air outlet) of the kiln thereby bypassing the preheater. The NOx process is initiated at a point in the cement making process wherein the kiln off gases will be at temperatures of at least 1150° C. Specifically, the entrance into the bypass system duct will generally be in the area located between the feed end 24*a* of the kiln and the kiln riser 27 wherein the kiln off gases are at temperatures ranging from at least 1150° C. to about 1350° C. and therefore at a location in the cement making process at which the process gasses are at temperatures above that at which a NOx reduction system would be utilized. As depicted in FIG. 1 the entrance into the bypass duct is located below the kiln riser 27 and below the calciner firing point 33*a*, at which location the temperatures of the kiln off gases will typically range from about 1150° C. to about 1250° C.

Figure 2:
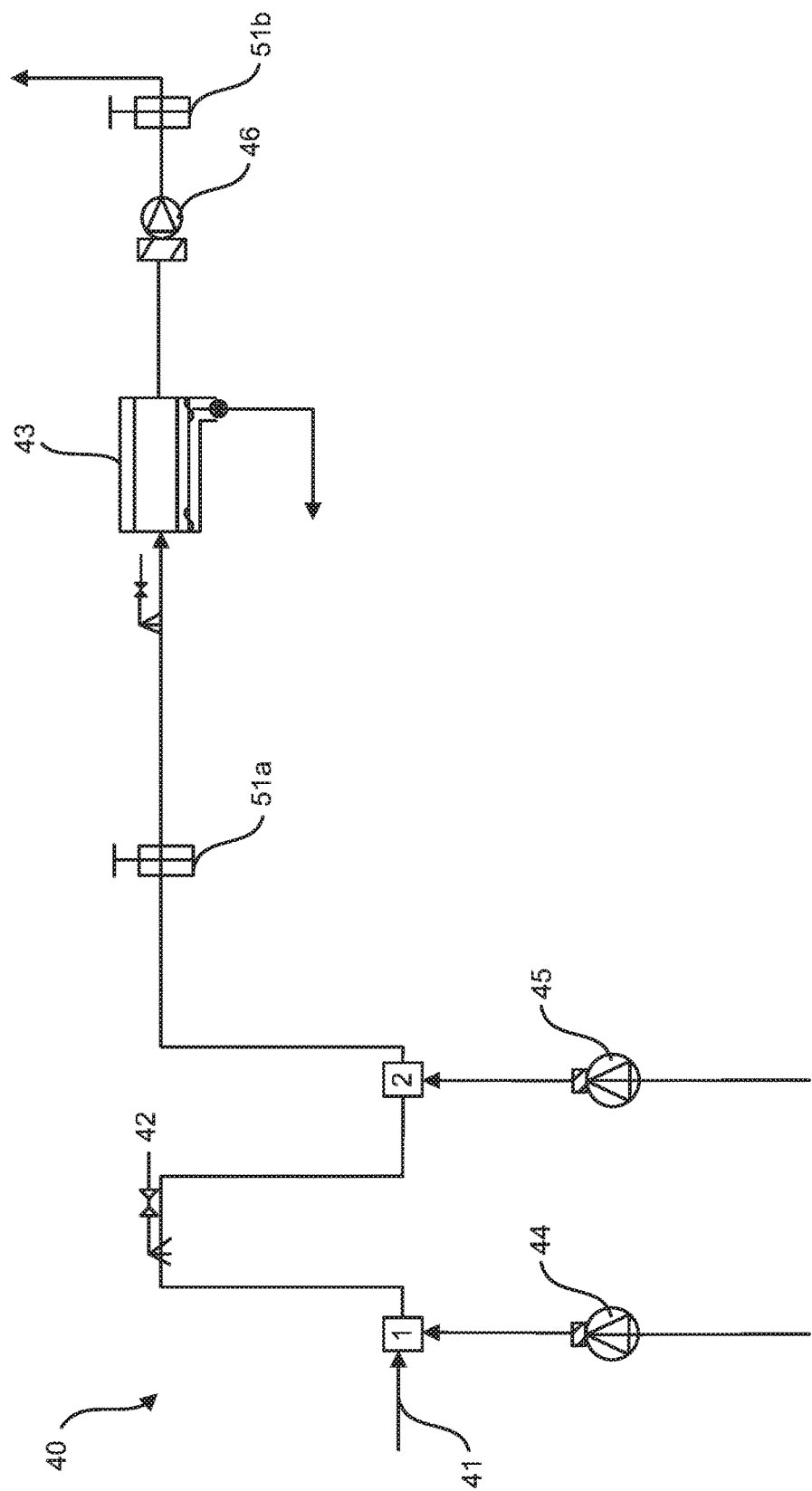
FIG. 2 is a flowchart showing in greater detail the chlorine/sulfur/alkalis bypass system of the present invention in which a NOx reduction system is located in the kiln bypass.

The present invention's kiln bypass system 40 is depicted in greater detail in FIG. 2.

Extracted kiln gases in bypass duct conduit 41 are not initially at a temperature suitable for SNCR injection, and such extracted gases are air quenched, such as by inserting ambient air into an optional mixing chamber 1 to bring the temperatures of the off gases to a point at which SNCR injection can commence, which depending upon the reagent utilized will be between about 850° C. to about 1050° C. Such injection will occur downstream from mix chamber 1 at injection point 42, wherein reagents such as urea and/or ammonia are injected into the kiln bypass conduit 41 to react with and remove the NOx by forming molecular nitrogen, carbon dioxide and water.

Mix chamber 1 is typically formed as a tubular housing with an exhaust gas inlet, an outlet for cooled exhaust gasses and a tangential inlet for cooling gases. The kiln bypass system 40 further comprises a first fan 44 for feeding cooling gases to the mixing chamber 1.

After the NOx removal, the kiln off gases are subject to further alkalis/chlorine/sulphur removal. In this regard it should be noted that the invention is not to be restricted to any particular method of alkalis/sulphur/chlorine removal employed in cement kiln bypass systems, and any removal method that can be undertaken in the temperature range of the exhaust gases after the NOx removal step can be employed in the invention.

The kiln bypass system 40 further comprises a second fan 45 for feeding cooling gases to optional mixing chamber 2, wherein the extracted kiln gases are subject to a secondary air quenching in mixing chamber 2 to about 375° C. to further assure that volatile matters, such as chlorine/sulfur/alkalis will begin to condense on dust that is entrained in the kiln gases. In this regard, the dust of lime, a primary component of cement, can advantageously adsorb SOx. The gases are then directed to a dust collector 43 such as an electric precipitator and the thus processed and dedusted combustion exhaust gas pulled through conduit 41 by third fan 46.

In order to recover the heat in the exhaust gas and also to satisfy the single stack requirements of many jurisdictions, the cleaned kiln bypass gas can be returned at point 50 (FIG. 1), from which point the gas containing latent heat will be directed to drier crusher 21.

The dust recovered by dust collector 43 can be returned to the cement making process. In that chlorine is more distributed on fine particle fraction of the dust, if the recovered dust is separated into coarse particles and fine particles by a classifier; the coarse particles may be returned to the cement kiln system; and the fine particles (i.e. chlorine bypass dust) containing separated potassium chloride (KCl) and the like can be added to a cement grinding mill system.

Also depicted are optional isolation gates 51*a* and 51*b* for isolating the area downstream of mixing chamber 2 to facilitate localized maintenance.

Significant energy savings are realized utilizing the present invention's bypass/NOx removal system as opposed to redirecting the bypass gases from prior art bypass system that do not contain NOx removal systems into precalciner 23 to preheat for optimum NOx removal at SNCR injection point 28.

Tables 1-3 present theoretical calculations for determining the energy savings that are realized by inserting the bypass gas into a crusher-drier utilized in a semi-dry cement making process. It should be noted that significant savings can also be realized by inserting bypass gas into a raw mill in a dry cement process.

The energy savings are calculated for a bypass that withdraws from 10% to 70% of the kiln gas entering the kiln riser duct and utilize the following definitions, assumptions and formulas:

Definitions

Mass=M (Kg/hr)

Specific heat=Cp (° C.)

Assumptions

Temperature of Gas Entering Bypass in Each Example=1100° C.

Temperature of Gas Exiting Bypass in Each Example=340° C.

Coal price=US$80 per metric/ton

Plant operates 24 hour day/330 days year

Flow through kiln riser=60,750 kg/hr

Quantity of clinker produced=2000 MTPD

Formulas

Heat=Mass (Kg/hr)×Specific Heat (Kcal/kg° C.)× Temperature (° C.)

Specific Heat [Gas Exiting Bypass]=0.252 (Kcal/kg° C.)

Fuel Fire=[[(Kcal/hr)/(6430 kcal/kg coal)]/1000](24) (330)

Fuel Net heat value=6430 kcal/kg coal

Cost Coal/Year=MTPY (Coal)×$80.00/MT Coal US$/Year

TABLE 1

Kiln Bypass- Mass of Extracted Gas

| % Kiln Gas Diverted To Bypass | Mass of Gas Entering Bypass Prior to Air Quenching (Kg/H) |
|---|---|
| 10 | 6075.0 |
| 20 | 12150.0 |
| 30 | 18225.0 |
| 40 | 24300.0 |
| 50 | 30466.8 |
| 60 | 36560.2 |
| 70 | 42653.5 |

TABLE 2

Energy In Exhaust Gas As It Exits Bypass System

| % Kiln Gas Diverted To Bypass | Mass of Gas Exiting Bypass After Air Quenching (Kg/H) | Heat Values in Exiting Gas (Kcal/H) | Heat Values in Exiting Gas Kcal/Kg Clinker produced |
|---|---|---|---|
| 10 | 27999.7 | 2395353.2 | 28.7 |
| 20 | 55999.4 | 4790706.5 | 57.5 |
| 30 | 83999.0 | 7186059.7 | 86.2 |
| 40 | 111998.7 | 9581413.0 | 115.0 |
| 50 | 140421.5 | 12012962.7 | 144.2 |
| 60 | 168505.8 | 14415555.2 | 173.0 |
| 70 | 196590.1 | 16818147.8 | 201.8 |

TABLE 3

Fuel Consumption Penalty (Assuming Bypass Gas Not Returned to Drier/Crusher)

| % Kiln Gas Diverted To Bypass | Metric Ton/Year | Fuel Savings/Year (US$) |
|---|---|---|
| 10 | 2950.42 | 236,033.56 |
| 20 | 5900.84 | 472,067.13 |
| 30 | 8851.226 | 708,100.69 |
| 40 | 11801.68 | 944,134.26 |
| 50 | 14796.68 | 1,183,734.55 |
| 60 | 17756.02 | 1,420,481.46 |
| 70 | 20715.35 | 1,657,228.37 |

The particular embodiments disclosed above are illustrative only as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention.

What is claimed is:

1. A bypass system for use with off gases that have exited a cement kiln utilized in a cement making process comprising:
   i) means to direct from about 10% to about 70% by mass of the off gases into a bypass duct;
   ii) means to remove NOx present in the off gases while the off gases are in the bypass duct;
   (iii) means to remove volatile components present in the off gases while the off gases are in the bypass duct; and wherein the off gases are redirected to the cement making process after NOx and volatile components removal steps.

2. A process to remove NOx from dust and volatile containing off gases from a cement kiln as said kiln is being utilized in a cement making process comprising:
   i) withdrawing the NOx containing kiln off gases from a location in the cement making process at which the temperature of such off gases is at least about 1150° C.;
   ii) reducing the temperature of such gases to a temperature that is suitable for reagent injection;
   iii) inserting a reagent into the off gases, said reagent reacting with the NOx in the off gases to thereby remove NOx from said off gases; and
   iv) subjecting the off gases to a second temperature reducing step to condense volatiles on the dust present in the kiln off gases.

3. The process of claim 2 wherein the reagent is ammonia or urea.

4. A bypass system for use with off gases that have exited a cement kiln utilized in a cement making process comprising:
   i) means to direct from about 10% to about 70% by mass of the off gases into a bypass duct;
   ii) means to remove NOx present in the off gases while the off gases are in the bypass duct;
   (iii) means to remove volatile components present in the off gases while the off gases are in the bypass duct; and
   wherein the off gases are inserted into a raw meal crushing means after the NOx and volatile components removal steps.

\* \* \* \* \*